UNITED STATES PATENT OFFICE 2,681,920

PREPARATION OF PHOSPHONATES

John L. Van Winkle, San Lorenzo, and Rupert C. Morris, Berkeley, Calif., assignors to Shell Development Company, Emeryville, Calif., a corporation of Delaware No Drawing. Application January 15, 1951,
Serial No. 206,114

10 Claims. (Cl. 260—403)

This invention relates to a method for the preparation of organic compounds containing phosphorus and it more particularly relates to a new method for the preparation of esters of phosphonic acids.

There are known various methods for the preparation of esters of phosphonic acids, such as via the so-called Arbuzov reaction between a trialkyl phosphite and an alkyl halide, by the metathetical reaction between a sodium dialkyl phosphite and an alkyl halide, and by reaction between an alcohol and a phosphonic acid halide. Although these and other less generally applicable methods have been employed with reasonable success, the known methods have in each case been limited to particular types of reactants, which in many cases may not be readily available, and in some cases they have been applicable to the preparation of desired product only with difficulty and with low yields of desired product.

Various esters of phosphonic acids have, in recent years, attracted attention because of their desirable properties that make them useful, depending upon the particular compound under consideration, as synthetic lubricants and hydraulic fluids, as flame-retardants for application to textiles and other fabrics, as plasticizers for natural and synthetic resins, and in other industrially important applications. Partly because of the technical importance of these phosphorus-containing compounds, there has been need and room for still further effective methods by which they can be prepared. The provision of a new method for the preparation or synthesis of esters of phosphonic acids forms one of the principal objects that has been accomplished by the present invention.

It has been discovered in accordance with the present invention that esters of phosphonic acids can be prepared by reaction of an alkalinous metal salt of a diester of phosphorous acid with an ester of a carboxylic acid to produce directly a diester of a phosphonic acid. The reaction that is effected according to the invention is believed to be a new reaction. It leads to the formation of a diester of a phosphonic acid in which diester the carbon atom that is directly linked to the phosphorus atom by a carbon-to-phosphorus bond is the carbon atom that, in the ester of the carboxylic acid, was directly attached to the acyloxy group by a bond to the oxy oxygen atom of the carbonyloxy group thereof, i. e., it is the carbon atom of the alcohol or phenol residue to which the acyloxy group of the carboxylic acid was directly linked. In the phosphonic acid diester that is produced by the reaction, the ester-forming groups, or the groups that are linked to the phosphorus atom through oxygen, correspond to the ester-forming groups of the phosphorous acid compound. The invention includes, in addition to the novel reaction per se, the process whereby the reaction is accomplished, and more particularly the process whereby an alkalinous metal salt of a diester of phosphorous acid is heated in admixture with an ester of a carboxylic acid, such as an ester of an unsubstituted fatty acid and an alcohol or a phenol, to produce a diester of a phosphonic acid, and the invention further includes particular ranges of conditions that have been found to be best suited in and for the execution of the process.

The novel reaction to which the present invention relates is illustrated by the following equations which show, respectively, the reaction between sodium dibutyl phosphite and n-butyl acetate to produce dibutyl butane phosphonate, and the reaction between sodium diethyl phosphite and beta-chloroethyl myristate to produce 1,2-bis(diethyl phosphono)ethane.

(a)

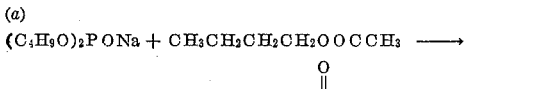

(b)

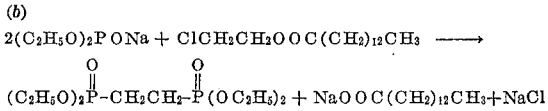

When n-propyl myristate is substituted for the beta-chloroethyl myristate shown in Equation b, the reaction is as follows:

(c)

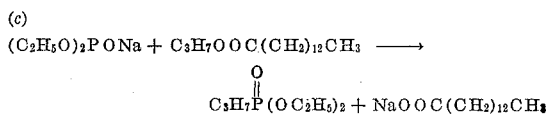

When an ester of one or more fatty acids higher than myristic acid, for example of a naturally occurring fat acid, such as an ester of one or more of oleic, linoleic, linolenic and stearic acid with a polyhydric alcohol, is used in place of the simpler esters illustrated above, one or more of the acid residues can be replaced by the esterified phosphono group. The reaction of a glyceride oil and the sodium salt of a diester of phosphorous acid thus can be carried out according to the equations:

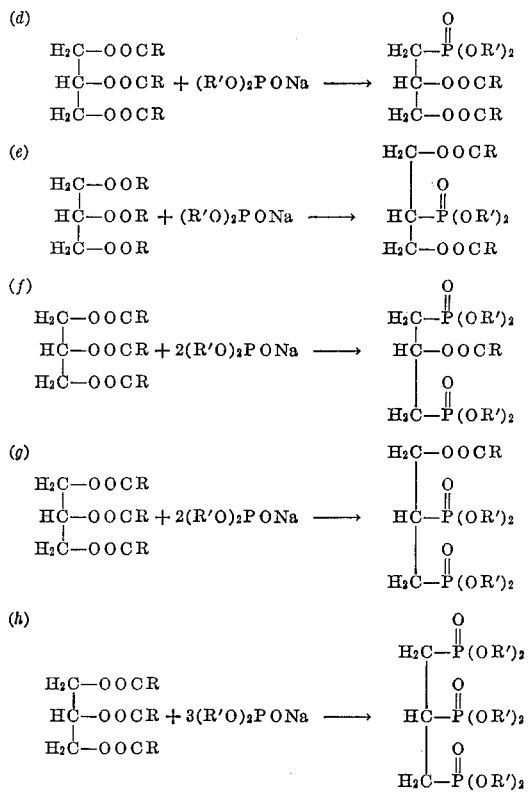

In Equations d, e, f, g and h each R represents a long-chain aliphatic radical containing preferably an odd number of carbon atoms between 13 and 19, inclusive, the groups represented by R in each molecule being the same or different, and R' represents, for example, a lower alkyl group, such as ethyl, isopropyl, butyl, or the like, or an aliphatic ethylenically unsaturated group, such as allyl, methallyl, or the like.

The reaction that is illustrated in the foregoing equations can be carried out by heating a mixture comprising the salt of the diester of phosphorous acid and the ester of the carboxylic acid at an elevated temperature that is conducive to the reaction but that is below a temperature that would cause excessive occurrence of decomposition, side-reaction, or the like. A broad range of temperatures suitable for the execution of the process of the invention is from about 50° C. to about 250° C. Although the optimum range of temperatures will depend, inter alia, upon the particular reactants that are to be used and the other conditions, a preferred range in most cases is from about 100° C. to about 200° C. In treating glyceride oils, the relatively higher temperatures, e. g., from about 150° C. up to about 225° C., generally are preferred. The reaction may be carried out in the presence of inert organic solvents, such as a hydrocarbon solvent, e. g., isooctane, toluene, or benzene, an ether, e. g., diamyl ether, dioxane, or diethylene glycol diethyl ether, or a nitroalkane, e. g., 3-nitrobutane. The amount of solvent, if one is employed, is not known to be critical. An amount of solvent from about one-half to about three times the weight of both reactants generally affords a readily manipulatable mixture from which, after the reaction is completed, the desired phosphonic acid diester can be easily recovered. When desirable, the inert solvent can be omitted entirely. Substantially anhydrous conditions preferably are employed, although the traces of moisture that may be present in technical samples of the reactants, the solvent, etc., are in general tolerable.

In carrying out the process of the invention the salt of the diester of phosphorous acid and the carboxylic acid ester are mixed and the mixture is heated in a suitable reaction vessel until the desired reaction has taken place. The salt of the phosphorous acid diester and the ester of the carboxylic acid preferably are employed in about the theoretically required amounts. When it is not desired to recover or isolate the phosphonic acid ester from the reaction products, e. g., when the process of the invention is used to modify glyceride oils, either small or larger amounts of the phosphorous acid compound may be used. Thus, treatment of a glyceride oil or a fat with as little as 2% by weight of an alkali metal salt of a diester of phosphorous acid has a noticeable effect upon the properties of the oil or fat. Treatment of glyceride oils, such as menhaden, sardine, and other fish oils, soybean, castor, cottonseed, corn, linseed, tung, and other natural drying, semi-drying, and non-drying vegetable oils, or animal oils or fat, such as tallow, with from about 5% to about 40% by weight of a sodium lower dialkyl phosphite, according to the invention affords modified oils having desirable properties that vary according to the particular conditions, oil, phosphorous acid compounds, etc. Heating a glyceride oil, preferably at about 200° C., with up to one molecular proportion of a salt of an ethylenically unsaturated ester of phosphorous acid, e. g., with sodium diallyl phosphite or sodium dimethallyl phosphite, and preferably with from about 0.65 to about 1 molecular proportion, provides in accordance with the invention a polymerizable modified oil having desirable drying characteristics, reduced flammability, and other properties that adapt it to use in the manufacture of resins, surface coatings, and like products.

Any suitable reaction vessel may be employed in accordance with the invention, and the process of the invention may be carried out either batchwise, intermittently, or continuously. When the process is conducted in the presence of inert solvents, the reaction mixture conveniently may be heated in a vessel equipped with a reflux condenser at the boiling point of the mixture. The pressure may be atmospheric, subatmospheric, or superatmospheric, as desired. In other cases, the mixture may be heated in a closed autoclave or other pressure-resistant vessel, in the presence or in the absence of solvents. When the boiling points of the reactants and product are such that undue loss through volatilization would not occur, the reaction frequently may be conducted most simply by heating the mixture in a vessel open to the atmosphere, under a blanket of inert gas, such as nitrogen, if desirable.

In accordance with the invention, the recovery of the phosphonic acid diester that is formed by the new reaction, if the same is to be recovered or separated from the reaction mixture, is carried out by any convenient applicable method. In many cases, it is preferred first to wash or to extract the reaction mixture with water to remove the carboxylic acid salt that is formed as a secondary product of the reaction. The remaining portion of the mixture, comprising the phosphonic acid diester, can be subjected to distillation, extraction with selective solvents, crystallization from solvents, adsorption, or other treatment adapted to recovery of the desired phosphonic acid diester. Since in many cases the properties of diesters of phosphonic acid diesters are well-known to those skilled in the art to which the present invention relates, suitable procedures for recovery of desired product will be evident to those skilled in the art and may be applied as desirable in each case. Depending upon the use to which the desired product is to be put, recovery of the phosphonic acid diester or separation from the reaction mixture of the carboxylic acid salt may be dispensed with entirely, if desired.

The following example will illustrate certain of the many possible applications of the new reaction to which the invention relates and certain of the various specific embodiments of the process by which it can be carried out. In the examples, "parts" means "parts by weight," unless otherwise specified.

Example I

A solution of sodium dibutyl phosphite in toluene is prepared by dissolving 233 parts of dibutyl phosphite in about an equal weight of toluene and adding 23 parts of sodium to the solution. The mixture is heated to boiling in a vessel equipped with a water-cooled reflux column until all of the sodium is dissolved. The resulting solution contains sodium dibutyl phosphite, a small amount of unreacted or excess dibutyl phosphite, and a solvent. While refluxing of the solution is continued, there are slowly added 126 parts of n-butyl acetate and the solution is refluxed (at about 110° C. to 115° C.) for 18 hours. The resulting mixture is washed by shaking several times with an equal weight of water to remove sodium acetate. The remaining solution then is dried over anhydrous calcium sulfate, and fractionally distilled. In addition to forerun, containing mostly toluene, there are obtained 104 parts of product distilling at about 113° C. under 1.4 mm. of mercury, and bottoms which are allowed to remain in the still kettle. The amount of the product, which is identified as dibutyl n-butanephosphonate, corresponds to an about 46% yield, based upon the amount of n-butyl acetate charged.

Example II

To a solution of 136 parts of dibutyl phosphite in 400 parts of toluene there are added 14 parts of sodium and the mixture is refluxed until the sodium dissolves. There then is added a solution of 129 parts of beta-chloroethyl myristate in 80 parts of toluene and the mixture is refluxed (at about 110° C. to 115° C.) for 5 hours. The mixture then is washed with water to extract sodium myristate and sodium chloride, and the washed mixture is dried over anhydrous calcium sulfate. Toluene then is evaporated from the dried solution and the remaining part is heated at 100° C. under about 1 to 3 mm. mercury pressure to remove volatile components. The non-volatilized residue amounts to 56 parts of 1,2-bis(dibutylphosphono)ethane, having the structure

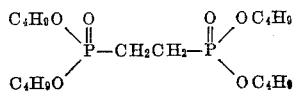

Example III

A solution of 450 parts of diisopropyl phosphite in about 1000 parts of toluene is treated with about 60 parts of sodium to form sodium diisopropyl phosphite. To the resulting solution there is added a solution of 276 parts of diethylene glycol diacetate dissolved in about an equal weight of benzene and the resulting mixture is heated at about 125° C. for 6 hours. The resulting mixture then is washed with water, dried, and the benzene, toluene and other lower boiling materials are evaporated off by heating to 100° C. under about 2 mm. Hg pressure. The product formed by the reaction in this example is bis(2-diisopropyl phosphonoethyl) ether, having the formula

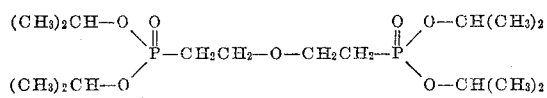

Example IV

A solution of sodium diallyl phosphite in toluene is prepared from diallyl phosphite and sodium in the manner illustrated in the foregoing examples. The solution, containing about 200 parts of sodium diallyl phosphite, is slowly added to about 1000 parts of linseed oil heated in an open kettle at about 175° C. while the heated oil is stirred with a power-driven mixer. After one hour at this temperature, the oil is rapidly cooled, washed with an aqueous solution of calcium chloride, and filtered. The modified oil, in which somewhat under one-third of the fatty acid residues have been replaced by the diallylphosphono radical, is a drying oil that is useful as a varnish ingredient and in the manufacture of oil-modified alkyd resins.

Example V

Castor oil is treated with sodium dioctyl phosphite in the manner illustrated in Example IV. The product is a phosphorus-containing modified oil that is useful as a synthetic lubricant and as a hydraulic fluid.

Example VI

A solution of 216 parts of sodium dibutyl phosphite in xylene is prepared according to the method illustrated in the preceding examples. To this solution there are added 35 parts of triacetin and the mixture is refluxed until the reaction is completed. 1,2,3-tris(dibutyl phosphono)propane is recovered according to the procedure illustrated in Example II.

Example VII

A solution of sodium dibutyl phosphite in benzene is prepared according to the method shown in the preceding examples. To the solution there is added tetrahydrofurfuryl acetate in an amount molecularly equivalent to the sodium dibutyl phosphite, and the solution is refluxed until the reaction has gone to completion. The product is recovered by washing the solution with water, drying over anhydrous calcium sulfate, and flashing off solvent and other lower-boiling components at 100° C. under 3 mm. Hg pressure. The product corresponds to dibutyl tetrahydro-2-furylmethanephosphonate, having the formula

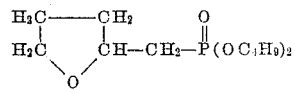

Example VIII

Diallyl phenylmethanephosphonate is prepared according to the method illustrated in Example I by treating benzyl acetate with sodium diallyl phosphite. The formula of diallyl phenylmethanephosphonate is

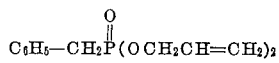

$$C_6H_5-CH_2P(OCH_2CH=CH_2)_2$$

Esters of carboxylic acids and a wide variety of alcohols and phenols can be substituted for the esters exemplified in the foregoing examples without exceeding the generic concepts of the invention. Representative esters that can be employed are the esters of carboxylic acids and aliphatic alcohols, such as esters of methyl alcohol, ethyl alcohol, isopropyl alcohol, octyl alcohol, decyl alcohol, stearyl alcohol, cetyl alcohol, and their various straight-chain and branched-chain homologs and analogs; of unsaturated alcohols, such as of allyl alcohol, methallyl alcohol, methyl isobutenyl carbinol, oleyl alcohol, and their various branched-chain and straight-chain analogs and homologs; of cycloaliphatic alcohols, such as of cyclohexanol, 3,3,5-trimethylcyclohexanol, 2-cyclohexen-1-ol, and cyclopentanol; and of aromatic alcohols, such as of benzyl alcohol, cinnamyl alcohol, phenethyl alcohol, and the like. Esters of heterocyclic alcohols, e. g., of tetrahydrofurfuryl alcohol and of 3-piperidine-2-ethanol also can be employed in the process of the invention. The process of the invention appears to be generally applicable to such esters of alcohols, whether the alcohols be of the primary, the secondary, or the tertiary variety. It is preferred, however, to employ esters of primary alcohols in the invention, or at least esters of alcohols which contain at least one primary hydroxyl group, inasmuch as there is less tendency for such esters to give rise to products of side reaction than the esters of secondary and tertiary alcohols. As shown in the examples, the ester can be an ester of a monohydric alcohol or it may be an ester of a polyhydric alcohol, e. g., of a glycol or of glycerine. In the case of the esters of polyhydric alcohols, the reaction may be governed to a certain extent by employing the respective reactants in suitable proportions. Thus, when an ester of a polyhydric alcohol is employed, reaction at all of the ester linkages may be favored by use of the stoichiometric equivalent or more of the salt of the phosphorous acid diester. Reaction may be effected at less than all of the ester linkages by employing correspondingly reduced amounts of the phosphorous acid compound.

Generally speaking, the carboxylic acid ester that is employed in accordance with the invention may be one in which the carboxylic acid residue is derived from almost any carboxylic acid. It will be apparent from the equations and examples presented hereinbefore that the residue of the carboxylic acid does not appear in the phosphonic acid diester formed as the product of the reaction. From the standpoint of their availability or the ease and cheapness with which they may be prepared, in many cases the esters of acetic acid are most desirably employed. More broadly speaking, the esters of the fatty acids, many of which are readily obtainable and some of which occur in nature, form a suitable type of ester that can be employed in the process. It is desirable, generally speaking, that the carboxylic acid residue should be free of substituents, i. e., the carboxylic acid resdue of the ester preferably is the residue of a carboxylic acid that is composed solely of carbon, hydrogen, and oxygen, such as a saturated carboxylic acid of the paraffin series or a corresponding acid containing one or more olefinic bonds. It is desirable that the ester of the carboxylic acid should be free of reactive substituents on the residue of the carboxylic acid and it is essential that it should be free of reactive substituents in the activated alpha and beta positions of the carboxylic acid residue. In accordance with the generic invention, the carboxylic acid ester can be the ester of a polybasic acid, such as an adipate or an oxalate, or it can be the ester of an aromatic carboxylic acid, such as a benzoate, although the use of such esters, because of their higher cost, is, in general, less desirable than the use of an ester of an aliphatic unsubstituted monocarboxylic acid.

The salt of the diester of phosphorous acid preferably is a sodium salt, although equivalent salts of alkalinous metals, such as the potassium, caesium, lithium, calcium, or barium salts can be employed, when desirable, the term alkalinous metals defining the group of elements consisting of the alkali and alkaline earth metals. The alkali metal salts form a preferred subgroup. The selection of the particular phosphorous acid diester which is to be employed in the form of its salt is determined primarily by the product that is to be prepared. Generally speaking, the organo-oxy groups of the phosphorous acid compound can be the groups denoted by RO— when ROH signifies any alcohol or a phenol. Typical salts of phosphorous acid diesters that can be employed include salts of aliphatic diesters, such as sodium diethylphosphite, sodium dibutylphosphite, potassium dioctylphosphite, sodium dihexylphosphite, sodium ethyl butylphosphite, sodium diallylphosphite, sodium dimethallylphosphite, sodium bis(2 - methoxyethyl)phosphite, and their analogs and homologs. Salts of aromatic esters of phosphorous acid also can be employed, such as sodium diphenyl phosphite, sodium di-p-chlorophenyl phosphite, sodium ethyl phenethyl phosphite, sodium phenyl naphthyl phosphite, and the like. When we refer to a salt of a diester of phosphorous acid, we intend to refer broadly to such salts of diesters in which the ester-forming residues may be the residues of aliphatic alcohols, aromatic alcohols, cycloaliphatic alcohols, phenols, or heterocyclic alcohols, and in which the two ester-forming groups may be like or unlike. The process of the invention is particularly effective for bringing about the desired reaction between esters of carboxylic acids and salts of diesters of phosphorous acid and aliphatic monohydric alcohols that contain from 1 to 10 carbon atoms, particularly sodium dialkylphosphites and sodium dialkenylphosphites, in which the alkyl and the alkenyl groups contain from 1 to 10 carbon atoms each.

The phosphonic acid diesters that can be prepared by the process of the invention include compounds that are useful as synthetic lubricants, hydraulic fluids, special solvents, insecticides, and other biologically active compounds, textile-treating agents, plasticizers and in various other technically significant applications. The modified glyceride oils that can be prepared according to the invention are useful as or in surface coating compositions, such as varnishes, paints, and the like, and in the manufacture of alkyd resins. Glyceride oils that have been modified according to the invention by treatment with a salt of a polymerizable ethylenically unsaturated phosphorous acid diester, e. g., with sodium diallylphosphite or sodium dimethallylphosphite, have modified drying characteristics and improved properties of the dried or hardened oil such that they are of particular interest as ingredients for use in the field of surface coatings.

It will be apparent that many specific embodiments of the invention are possible. It is desired to claim the invention as broadly as the prior art permits with reference to the hereto-appended claims.

We claim as our invention:

1. The method of preparing 1,2-bis(dibutylphosphono)ethane, which method comprises adding beta-chloroethyl myristate to a solution of sodium dibutylphosphite in toluene, heating the resulting solution at a temperature of about 110° C. to 115° C. until said 1,2-bis(dibutylphosphono)ethane is formed, and then recovering said 1,2-bis(dibutylphosphono)ethane from the reaction mixture.

2. The method of producing dibutyl butanephosphonate, which method comprises adding butyl acetate to a solution of sodium dibutylphosphite in toluene, heating the resulting mixture at about 110° C. to 115° C. until said dibutyl butanephosphonate is formed, and then recovering said dibutyl butanephosphonate from the mixture.

3. The method of preparing a modified linseed oil, which method comprises heating linseed oil in the presence of about 20% by weight of added sodium diallylphosphite at a temperature of about 175° C. until appreciable and substantial reaction between said linseed oil and said added sodium diallylphosphite has occurred.

4. The method of preparing a dialkyl alkanephosphonate, which method comprises heating a reaction mixture comprising as its essential reactants an alkalinous dialkylphosphite and an alkyl acetate at a temperature within the range of from about 100° C. to about 200° C. to produce said dialkyl alkanephosphonate.

5. In the preparation of a dialkyl alkanephosphonate the step which comprises reacting at a temperature of from about 100° C. to about 200° C. an alkali metal dialkylphosphite with an alkyl ester of a saturated fatty acid to produce said dialkyl alkanephosphonate.

6. In the preparation of a diester of a phosphonic acid and an aliphatic unsubstituted alcohol, the step which comprises reacting at a temperature of from about 50° C. to 250° C., an alkalinous salt of a diester of phosphorous acid and an unsubstituted aliphatic alcohol with an ester of a fatty acid to produce said diester of a phosphonic acid and an unsubstituted aliphatic alcohol, in which ester the carbon atom that is directly linked to the phosphorus atom is the carbon atom that, in the carboxylic acid ester, was directly attached to the acyloxy group by a bond to the oxy oxygen atom of the carbonyloxy group thereof.

7. The method of producing a modified glyceride oil, which method comprises adding an alkalinous salt of a diester of phosphorous acid and an aliphatic alcohol to a glyceride oil and heating and reacting the mixture at a temperature of from about 150° C. up to about 225° C. to produce said modified glyceride oil.

8. In the preparation of a diester of a phosphonic acid and an unsubstituted alcohol, the step which comprises reacting at a temperature of from about 50° C. to about 250 C. the sodium salt of a diester of phosphorous acid and an unsubstituted aliphatic alcohol with an ester of an alcohol and a carboxylic acid, which carboxylic acid is composed of carbon, hydrogen and oxygen only, to produce said diester of a phosphonic acid.

9. In the preparation of a dialkyl alkanephosphonate, the step which comprises reacting at a temperature of from about 50° C. to 250° C. an alkyl acetate with a sodium dialkyl phosphite to produce said dialkyl alkanephosphonate and sodium acetate.

10. In the preparation of a phosphonate, the step which comprises reacting at a temperature of from about 50° C. to 250° C. an alkali metal salt of a diester of phosphorous acid with an ester of fatty acid composed only of hydrogen, carbon and oxygen, to produce an ester of a phosphonic acid wherein the carbon atom that is directly linked to the phosphorus atom is the carbon atom that, in the carboxylic acid ester, was directly attached to the acyloxy group by a bond to the oxy oxygen atom of the carbonyloxy group thereof.

References Cited in the file of this patent

UNITED STATES PATENTS

| Number | Name | Date |
|---|---|---|
| 2,272,668 | Honel | Feb. 10, 1942 |
| 2,460,043 | Teeters | Jan. 25, 1949 |
| 2,466,393 | Dickey | Apr. 5, 1949 |
| 2,490,748 | Dickey | Dec. 6, 1949 |
| 2,550,651 | Dickey | Apr. 24, 1951 |
| 2,559,854 | Dickey et al. | July 10, 1951 |